(12) United States Patent
Xu et al.

(10) Patent No.: US 10,097,623 B2
(45) Date of Patent: Oct. 9, 2018

(54) METHOD AND DEVICE FOR DISPLAYING INFORMATION FLOWS IN SOCIAL NETWORK, AND SERVER

(71) Applicant: Xiaomi Inc., Beijing (CN)

(72) Inventors: Ruijun Xu, Beijing (CN); Zhenwei Wen, Beijing (CN); Bo Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 258 days.

(21) Appl. No.: 15/066,796

(22) Filed: Mar. 10, 2016

(65) Prior Publication Data

US 2016/0323364 A1 Nov. 3, 2016

(30) Foreign Application Priority Data

Apr. 28, 2015 (CN) .......................... 2015 1 0209620

(51) Int. Cl.
| | |
|---|---|
| *G06F 15/16* | (2006.01) |
| *H04L 29/08* | (2006.01) |
| *G06Q 50/00* | (2012.01) |
| *G06F 17/30* | (2006.01) |
| *H04L 12/58* | (2006.01) |

(52) U.S. Cl.
CPC ........ *H04L 67/10* (2013.01); *G06F 17/30719* (2013.01); *G06Q 50/01* (2013.01); *H04L 67/2838* (2013.01); *G06F 17/30598* (2013.01); *G06F 17/30705* (2013.01); *H04L 51/16* (2013.01); *H04L 51/32* (2013.01)

(58) Field of Classification Search
CPC ........ H04L 67/10; H04L 51/32; H04L 51/16; G06Q 50/01; G06F 17/30719; G06F 17/30598; G06F 17/30705

USPC .......................... 707/737, 738; 709/204, 206
See application file for complete search history.

(56) References Cited

U.S. PATENT DOCUMENTS

| | | | |
|---|---|---|---|
| 8,788,487 B2 | 7/2014 | Stout et al. | |
| 8,996,625 B1 * | 3/2015 | Singleton | ................ H04L 29/06 707/771 |

(Continued)

FOREIGN PATENT DOCUMENTS

| | | |
|---|---|---|
| CN | 101976267 A | 2/2011 |
| CN | 102411593 A | 4/2012 |

(Continued)

OTHER PUBLICATIONS

Extended European Search Report dated Sep. 23, 2016 in Patent Application No. 16158097.2.

(Continued)

*Primary Examiner* — Liangche A Wang
*Assistant Examiner* — Johnny Aguiar
(74) *Attorney, Agent, or Firm* — Oblon, McClelland, Maier & Neustadt, L.L.P.

(57) ABSTRACT

The present disclosure relates to a method and a device for displaying information flows in a social network. The method includes judging whether pieces of target information with a number of pieces being greater than or equal to a set number exist in information flows posted within a set time period by a user of the social network, aggregating the pieces of target information into one or more target information groups according to a preset rule when the pieces of target information exist, and displaying the target information group.

11 Claims, 6 Drawing Sheets

(56) References Cited

U.S. PATENT DOCUMENTS

| | | | |
|---|---|---|---|
| 9,195,705 | B2 | 11/2015 | Stout et al. |
| 9,461,833 | B1* | 10/2016 | Marra ................. H04L 12/1822 |
| 2011/0231499 | A1 | 9/2011 | Stovicek et al. |
| 2013/0097481 | A1* | 4/2013 | Kotler ................... G06F 17/241 |
| | | | 715/230 |
| 2013/0132393 | A1 | 5/2013 | Chen et al. |
| 2013/0268839 | A1* | 10/2013 | Lefebvre ................ G06F 17/21 |
| | | | 715/234 |
| 2014/0156637 | A1 | 6/2014 | Stout et al. |
| 2014/0222933 | A1 | 8/2014 | Stovicek et al. |
| 2014/0250137 | A1 | 9/2014 | Stout et al. |
| 2014/0351404 | A1 | 11/2014 | Li |
| 2016/0004761 | A1* | 1/2016 | Zhang .................. G06Q 10/10 |
| | | | 707/740 |
| 2016/0173435 | A1* | 6/2016 | Abou Mahmoud .... H04L 51/32 |
| | | | 709/206 |

FOREIGN PATENT DOCUMENTS

| | | |
|---|---|---|
| CN | 102750341 A | 10/2012 |
| CN | 102932454 A | 2/2013 |
| CN | 103020152 A | 4/2013 |
| CN | 103389853 A | 11/2013 |
| CN | 104809209 A | 7/2015 |
| EP | 2 369 820 A2 | 9/2011 |
| EP | 2 369 820 A3 | 9/2011 |
| EP | 2 814 211 A1 | 12/2014 |
| JP | 2011-243078 A | 12/2011 |
| JP | 2014-157542 A | 8/2014 |
| KR | 10-1194766 B1 | 10/2012 |
| KR | 10-2014-0062706 A | 5/2014 |
| RU | 2 451 992 C2 | 5/2012 |
| WO | WO 2014/085341 A1 | 6/2014 |
| WO | WO 2016/173244 A1 | 11/2016 |

OTHER PUBLICATIONS

Japanese Office Action dated Jun. 6, 2017 in Patent Application No. 2017-514781.

Korean Office Action dated Jan. 25, 2017 in Patent Application No. 10-2016-7001032.

Combine Russian Federation Office Action and Search Report dated Dec. 28, 2016 in Patent Application No. 2016102645/08(003811) (with English translation).

Russian Federation Office Action dated Aug. 3, 2017 in Patent Application No. 2016102645/08(003811) (with English translation).

Anonymous: "OneTeam Desktop: Unique Features Highlight" ProcessOne, Retrieved from the Internet: URL:https://blog.process-one.net/oneteam_desktop_unique_features_highlight/, XP002761604, Dec. 22, 2010, pp. 1-10.

International Search Report dated Feb. 14, 2016 in PCT/CN2015/095129 (with English language translation of categories of cited documents).

* cited by examiner

METHOD AND DEVICE FOR DISPLAYING INFORMATION FLOWS IN SOCIAL NETWORK, AND SERVER

CROSS-REFERENCE TO RELATED APPLICATIONS

This application is based upon and claims priority to Chinese Patent Application No. 201510209620.0, filed Apr. 28, 2015, the entire contents of which are incorporated herein by reference.

TECHNICAL FIELD

The present disclosure relates to the field of communication technology, and more particularly, to a method and a device for displaying information flows in a social network, and a server.

BACKGROUND

With the development of Social Network Software (SNS), various social networks, such as MicroBlog, WeChat, and the like gradually become people's favorite common communication tools. Taking MicroBlog for example, each user can post information, and browse information posted by other users. On a home page of a user, information posted by the user and other users followed by the user is usually displayed.

In related arts, when a user of a social network posts a relatively large volume of information within a certain period of time, a significant part of a page will be occupied (known as "spam the flooding"), so that information posted by other users is not easy to see, which brings a poor user experience for using the social network.

SUMMARY

For this, the present disclosure provides a method and a device (e.g., client terminal device, server device) for displaying information flows in a social network.

Aspects of the disclosure provide a method for displaying information flows in a social network. The method includes judging whether pieces of target information with a number of pieces being greater than or equal to a set number exist in information flows posted within a set time period by a user of the social network, aggregating the pieces of target information into one or more target information groups according to a preset rule when the pieces of target information exist, and displaying the target information group.

Aspects of the disclosure provide a device for displaying information flows in a social network. The device includes a processor and a memory for storing instructions executable by the processor. The processor is configured to judge whether pieces of target information with a number of pieces being greater than or equal to a set number exist in information flows posted within a set time period by a user of the social network, aggregate the pieces of target information into one or more target information groups according to a preset rule when the pieces of target information exist, and display the target information group.

Aspects of the disclosure provide a non-transitory readable storage medium comprising instructions, executable by a processor in a device to perform operations for displaying information flows in a social network. The operations include judging whether pieces of target information with a number of pieces being greater than or equal to a set number exist in information flows posted within a set time period by a user of the social network, aggregating the pieces of target information into one or more target information groups according to a preset rule when the pieces of target information exist, and displaying the target information group.

It is to be understood that both the foregoing general description and the following detailed description are exemplary and explanatory only and are not restrictive of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

The terminologies used herein are only for describing particular embodiments but not for limiting the present disclosure. The singular form words "a", "the", and "said" used in the present disclosure and append claims are intended to include plural form, unless otherwise clearly stated. Also, it shall be appreciated that the terminology "and/or" used herein refers to any or all combinations of one or more listed related items.

It shall be appreciated that although the present disclosure uses terminologies "first", "second", and "third" and the like to describe various information, the information shall not be limited by these terminologies. Using these terminologies is only for distinguishing information of the same type. For example, without departing from the scope of the present disclosure, the first information may be referred to as the second information, and similarly, the second information may be referred to as the first information. Depending on the context, the terminology "if" used herein may be interpreted as "when" or "in response to determining that . . . ".

Figure 1:
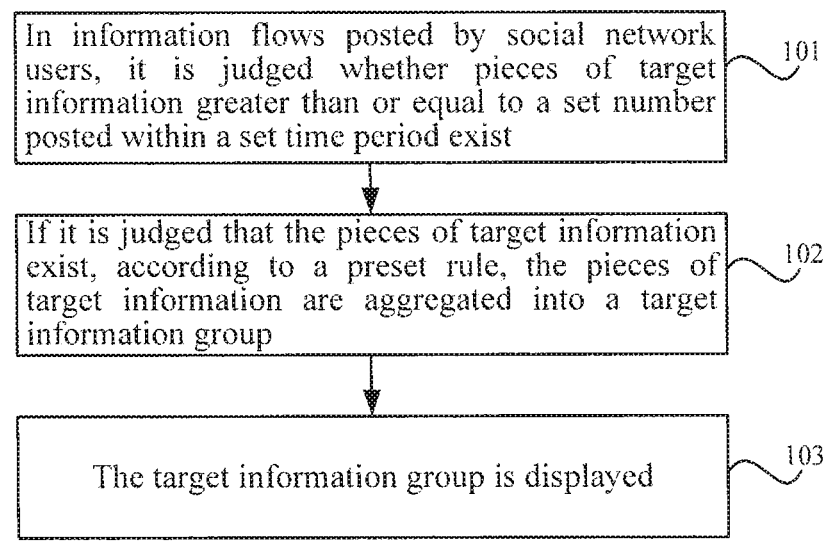
FIG. 1 is a flowchart illustrating a method for displaying information flows in a social network, according to an exemplary embodiment of the present disclosure.

As shown in FIG. 1, FIG. 1 is a flowchart illustrating a method for displaying information flows in a social network, according to an exemplary embodiment. The method can be used in a server, and the method includes the following steps. In an example, a server refers to a computer program that can be executed on a computer to turn the computer into a server machine. In another example, a server refers to a machine (can be either real machine or virtual machine) that executes a server program.

Step 101. From information flows posted by users of the social network, pieces of target information are detected. The pieces of target information are information that satisfies certain criteria. For example, the pieces of target information are certain pieces of information posted in a film period (e.g., a set time period) with a quantity measure being over a threshold (e.g., a set number). In an example, whether, within a set time period, there exist pieces of target information greater than or equal to a set number is judged.

The server can be any suitable server. In an example of a webpage based Social Network Software, such as MicroBlog the server can be a web server. In an example of a terminal device running Application (APP) based Social Network Software, such as WeChat, the server can be an APP server. The terminal device can be any suitable terminal device with Internet connecting capacity, such as a mobile phone, a tablet computer, a Personal Digital Assistant (PDA), and the like. The method can also be applied in a client side of a client-server system.

In the present disclosure, the server can acquire information posted by users of a social network in advance. The users of the social network herein include a main user logging in his/her account of the social network and users followed by the main user (hereinafter, referred to as "followed users"), or the main user's friends. The server can acquire the information posted by the users in various manners, such as a manual refresh manner, an auto refresh manner, and the like. In the manual refresh manner, a refresh instruction is initiated in response to an operation of the main user for example. The server detects the refresh instruction, and acquires information posted by each user of the social network in response to the refresh instruction. In the WeChat example, a refresh instruction is generated in response to a drop-down operation from the main user. In the MicroBlog example, a refresh instruction is generated in response to a manual activation of a refresh function by the main user. In the auto refresh manner, the server of a social network (e.g., Qzone and the like) automatically acquires information posted by users of the social network during a pre-determined time interval. With the above manners, the server can obtain original information flows from the users of the social network. In an example, a piece of posting information in the original information flows includes a user account (a username) for a user who generates the posting information, a time when the posting information is generated, contents of posted information, and the like.

It is noted that the quantity measure for information posted in the time period can be any suitable measure, such as the number of (posting) pieces of the information, the number of lines in the information, the number of characters in the information, and the like. In the following description, the number of pieces of the information is used as an example for the quantity measure. In an embodiment for judging the existence of the pieces of target information, the set time period can be set to, for example, 1-3 hours, the set number of the target information can be set to, for example, 6 pieces. The set number of the target information by one user can be set based on factors, for instance, the number of followed users, the habit of reading social network information by the main user, and the like. For example, if there are many users followed by the main user, the total number of the piece of information in the information flows can be large; in this case, when a followed user continuously posts four or five pieces of information, the posting of the four or five pieces of information may cause interference to the main user. In this example, the set number for one user can be set relatively small, such as 4 pieces. Whereas, in the case that there is small number of followed users, the set number of the target information for one user can be set to be relatively large number, such as 8-10 pieces. For another example, when the main user is busy, his/her time for reading the social network information every day is limited, and the main user can probably look at the social network information roughly, in this case, the set number for one user can also be set to be relatively small.

Step 102. When the pieces of target information exist, the pieces of target information are aggregated into one or more target information groups according to a preset rule.

In embodiments of the present disclosure, the pieces of target information can be aggregated based on whether the pieces of target information are posted by the same user, and can also be aggregated based on the keyword of the pieces of target information, and so on. These cases are discussed separately in embodiments of the present disclosure. In addition, the present disclosure illustrates how to aggregate the pieces of target information illustrated using an exemplary scenario. In the scenario, the main user has a plurality of followed users a, b, c, and the like. Further, in the scenario, the set time period is 1 hour, the set number is 4 pieces, and the followed user a posts six pieces of information: information a1, a2, a3, a4, a5 and a6. The pieces of target information a1-a5 are posted within 1 hour, thereby the pieces of target information a1, a2, a3, a4 and a5 satisfy the judging condition in step 101, and can be detected as "target information".

Firstly, in an embodiment, the respective pieces of target information are posted by the same user. When there is no interval information posted by other users between post times of respective pieces of target information, the pieces of target information are aggregated into a target information group.

In this embodiment, within the time the followed user posts the pieces of target information, the pieces of target information are not separated by information posted by other followed users; here, information posted by other followed users is referred to as "interval information", that is, in the information flows, post times of several pieces of target information are adjacent and continuous, thereby the several pieces of target information can be aggregated into a target information group.

In view of the scenario of the present disclosure, i.e., within the time the followed user a posts the pieces of target information a1, a2, a3, a4 and a5, there is no information posted by other followed users, information posted by other followed users is before target information a1 with the earliest post time or after target information a5 with the latest post time. Then, the pieces of target information a1-a5 can be aggregated into a target information group.

Then, in another embodiment, the respective pieces of target information are not posted by the same user, or there is information posted by other users between post times of respective pieces of target information.

A first case: when there exists the interval information posted by other users between post times of respective pieces of target information, two or more consecutive pieces of target information are aggregated into a target information group.

If there exists the interval information posted by other followed users within a post time period of several pieces of target information, the several pieces of target information can be split by the interval information (i.e., by the post time of the interval information), and then when the split pieces of target information have greater than or equal to two adjacent pieces, the adjacent pieces of target information can be aggregated.

In view of the scenario of the present disclosure, in an example, the followed user b posts information b1 between post times of the pieces of information a1 and a2 posted by the followed user a. In this example, the information flows in order of time are a1, b1, a2, a3, a4 and a5. Since the followed user a just posts a piece of target information a1 before the information b1 is posted, the target information a1 can be processed without aggregation. However, since the followed user a posts four pieces of target information a2-a5 after the information b1 is posted, the pieces of target information a2-a5 can be aggregated into a target information group.

In another example, the followed user b posts information b1 between post times of the pieces of information a2 and a3 posted by the followed user a. In this example, the information flows in order of time are a1, a2, b1, a3, a4 and a5. The information b1 splits the pieces of target information into two partitions a1-a2 and a3-a5. Both of the partitions have more than two pieces, thus the pieces of target information a1-a2 and a3-a5 are aggregated respectively to obtain two target information groups.

A second case: when the pieces of target information are posted by two or more users, and at least two groups of target information from different users are alternately posted, the pieces of target information are aggregated into a target information group respectively according to the different users to which the pieces of target information belong.

In view of the scenario of the present disclosure, in an example, the followed user b posts the information b1 within the post time between the pieces of information a1 and a2, posts information b2 within the time between the pieces of information a2 and a3, and posts information b3 within the time between the pieces of information a3 and a4. In this example, the information flows according to the time order are a1, b1, a2, b2, a3, b3, a4 and a5. It can be seen from above, the pieces of information b1-b3 posted by the followed user b are the target information, and at least two groups of information from the followed user a and the followed user b are alternately posted, then, in this case, according to the different posters, the pieces of target information a1-a5 and the pieces of target information b1-b3 are aggregated respectively.

In another example, the user b does not post the information b3 within the time between the pieces of target information a3 and a4 are posted, and the user c posts information c1 within the time between the pieces of target information a4 and a5 are posted. In this example, the information flows according to the time order are a1, b1, a2, b2, a3, a4, c1 and a5. Then, the pieces of target information a1, a2, a3 and a4 are aggregated into a target information group, the pieces of target information b1 and b2 are aggregated into a target information group, and aggregation processing is not made to the information a5 that is separated by the information c1.

Finally, in another embodiment, the pieces of target information are aggregated based on a keyword and attribute classification of each piece of target information.

In this embodiment, firstly, the keyword can be extracted from each piece of target information, the keyword can be one or more words with the highest frequency in the each piece of information; then, a preset attribute database is searched based on the extracted keyword, and attribute class of the each piece of target information is determined; finally, two or more pieces of target information belonging to the same attribute class in the pieces of target information are aggregated.

The pieces of target information can also be aggregated based on the keyword. For example, a large number of users forward a post associated with "Under the Dome" of Jing CHAI within one day or a certain period of time, thereby the keyword or attribute class is the same, in this case, the pieces of target information can be aggregated.

Step 103. The target information group is displayed.

For the target information group, since two or more pieces of target information are included, in order to solve the problem that a large part of a page is occupied, the present disclosure will not display all information in the target information group, but make some improvements to the display manner.

The display manner in step of the present disclosure can be that: key information (such as an abstract, or a keyword, or attribute class to which the latest piece of target information belongs) in the latest piece of target information newly posted in the target information group is extracted; the abstract or the keyword in the latest piece of target information is used as display information, and other pieces of target information except the latest piece of target information are folded or hidden; post time of the latest piece of target information is used as post time of the target information group; and the target information group is displayed, and information not aggregated is also displayed, the target information group and the information not aggregated are displayed according to a post time order.

The scenario applicable for this display manner includes: there exist users who like to post a large number of contents, for example, record his/her state of life in a day, or like to forward a large number of all kinds of posts. In this case, by only displaying the abstract or the keyword, other users can understand whether contents posted by the user needs to be viewed in detail. The scenario applicable for this display manner also includes: certain followed user most likely posts information in some specific fields. In this case, by displaying the keyword or the attribute class of the target information group, other users can understand information posted by the user clearly. For example, for a user, who sells products on MicroBlog or WeChat, a large number of pictures and texts of the products posted by the user can cause interference to the user's friends, who have no need to buy this kind of product. When the user's friends block the user, the user's friends can miss information of useful items. In the present disclosure, the items posted by a user (seller of the items) are usually similar products in a same category, such as in the jewelry category, in maternal and child product category, and the like. When the user posts information of the items, the keyword or the attribute class of the pieces of target information can be displayed by aggregating, thereby the user's friends can understand the products posted by the user, and are not disturbed by too many pictures and texts.

The display manner in step of the present disclosure can also be that: the latest piece of target information newly posted in the target information group is used as display information, and other pieces of target information except the latest piece of target information are folded or hidden; post time of the latest piece of target information is used as post time of the target information group; and the target information group and the information not aggregated are displayed in order of post time.

The scenario applicable for this display manner includes: for example, there exist users who like to post a large number of all kinds of contents, and like to forward a lame number of all kinds of posts. In this case, by displaying the latest piece of target information, other users can understand the user's updates.

Whether the users (the main user and the followed users) log in social network accounts via a webpage or a client terminal or other ways, the information posted by a user has a display area allocated for the information. The display area can also display a username of the user to which the information belongs, and post time of the information. The post time can be a particular time point, and can also be approximate time (such as a day ago, 1 hour ago, and the like) for posting the information. The display area can also display post source of the information. In an example, the display area displays "iPhone" which indicates that the information is posted by the user via an iPhone. In another example, the display information in the display area is indicative of the user using 360 Browser to post the information.

In above display manners, partial information in the target information group is used as display information, and other information is folded or hidden. It is noted that the number of pieces of information included in the target information group can also be used as display content. The above display manners can also be combined. In addition, functional options (e.g., icons), used to prompt "unfold the display", and the like, can be set in the display area of the target information group. In an example, when the user clicks an icon of "unfold the display", all pieces of folded or hidden target information will be displayed. In addition, for each piece of information, the functional options, such as "forward", "comment", "edit", "like", "collect" and "reply", and the like, can be set in the display area for the user to operate.

Figure 2A:
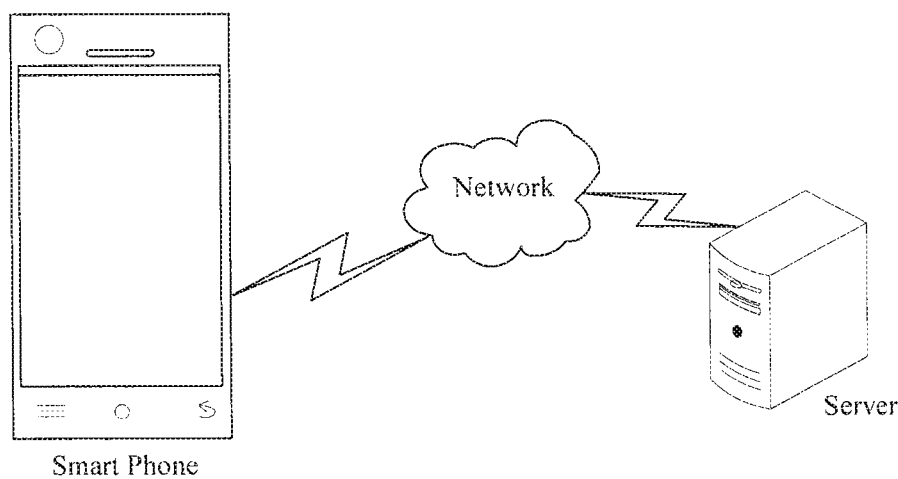
FIG. 2A is a schematic diagram illustrating an application scenario for displaying information flows in a social network, according to an exemplary embodiment of the present disclosure.

FIG. 2A is a schematic diagram illustrating an application scenario for displaying information flows in a social network, according to an exemplary embodiment of the present disclosure. In FIG. 2A, the application scenario, includes a terminal device and a server device that form a client-server system. Particularly in the FIG. 2A example, the terminal device is a smart phone. Using WeChat as an example of a Social Network Software, an APP client of WeChat is installed in the smart phone, and the server device is a WeChat server.

Figure 2B:
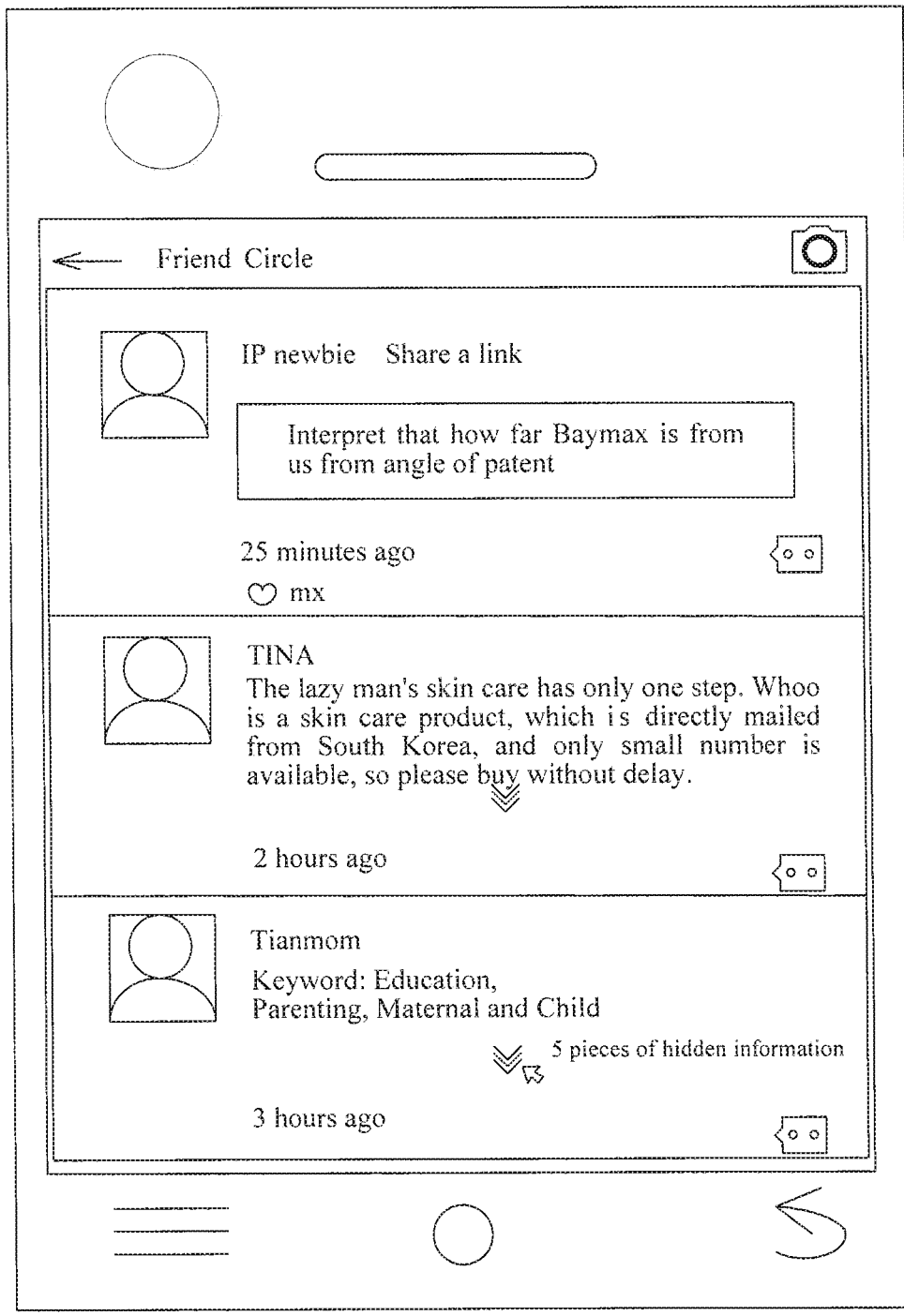
FIG. 2B is a schematic diagram illustrating another application scenario for displaying information flows in a social network, according to an exemplary embodiment of the present disclosure.

FIG. 2B is a schematic diagram illustrating a client device in an application scenario for displaying information flows in a social network, according to an exemplary embodiment of the present disclosure. Referring to FIG. 2B, the client device is installed with the APP client of WeChat. The APP client of WeChat detects that a main user logs in. In response to a drop-down refresh operation performed by the main user for example, the APP client of WeChat acquires, from the WeChat server, information flows posted by the main user and users followed by the main user. Specifically, in an example, the information flows are posted by the users after last time of acquiring the information flows. From the acquired information flows, the APP client detects pieces of target information, for example judges whether, in a set time period, there exist pieces of posted information (i.e., target information) with the number of pieces being greater than or equal to a set number. In this example, the set time period is 2 hours, and the set number is 5. The APP client detects that 6 pieces of information (i.e., target information) are posted within 1.5 hours by a user TINA, thereby the APP client aggregates the 6 pieces of target information into a target information group, and uses latest posted information as display information of the target information group. The APP client also detects that 5 pieces of information are posted within 2 hours from a user Tianmom. Then, the APP client extracts keywords of the pieces of target information, and finds out that most of the keywords are the same, thereby the APP client uses keywords "education", "parenting", and "maternal and child" in a piece of newly posted target information as display information of the target information group, and folds and hides other pieces of information. And, the APP client can also be configured to include an unfolding icon in the user interface (e.g., touch screen), and when a mouse is moved to the unfolding icon, the number of pieces of information being hidden is then shown on the user interface. In the FIG. 2B example, "5 pieces of information are hidden" is displayed when the mouse is moved to the unfolding icon. In the FIG. 2B example, post time of the target information newly posted in the target information group is used as post time of the target information group, and the target information group and information not processed (i.e., information posted by a user IP newbie) in the information flows are displayed.

In the application scenarios shown in FIG. 2A and FIG. 2B, specific processes for displaying information flows in a social network are described in the descriptions of FIG. 1 and therefore the descriptions are omitted here.

In addition to the above embodiments of the method for displaying information flows in a social network, the present disclosure further provides embodiments of a device for displaying information flows in a social network, and a server for displaying information flows in a social network.

Figure 3:
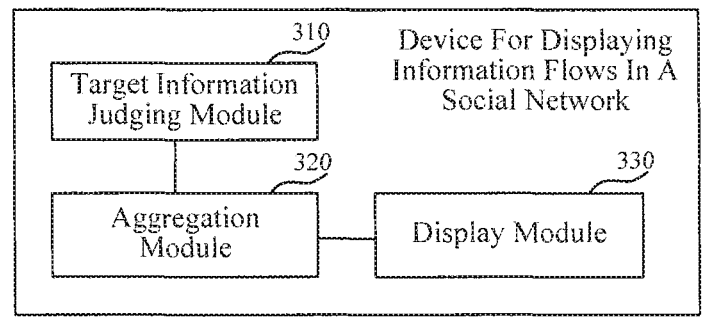
FIG. 3 is a block diagram illustrating a device for displaying information flows in a social network, according to an exemplary embodiment of the present disclosure.

As shown in FIG. 3, FIG. 3 is a block diagram illustrating a device for displaying information flows in a social network, according to an exemplary embodiment of the present disclosure. The device includes a target information judging module 310, an aggregation module 320 and a display module 330.

The target information judging module 310 is configured to, in information flows posted by users of the social network, detect pieces of target information. In an example, the target information judging module 310 is configured to judge whether, within a set time period, there exist pieces of target information with the number of pieces being greater than or equal to a set number.

The aggregation module 320 is configured to, when the judging module 310 judges the pieces of target information exist, according to a preset rule, aggregate the pieces of target information into a target information group.

The display module 330 is configured to display the target information group aggregated by the aggregation module 320.

In the above embodiment, for the acquired social network information flows, the server or the client judges whether, within a set time period, there exist pieces of posted target information with the number of pieces being greater than or equal to a set number. When it is judged that the pieces of target information exist, according to a preset rule, the server or the client aggregates the pieces of target information into a target information group. Then, the server or the client causes the target information group to be suitably displayed. By aggregating the pieces of target information into the target information group, the present disclosure solves the problem that a large part of a page is occupied while a large number of information is posted by the user within a short time, which causes interference to other users; and the present disclosure improves and optimizes user experience.

Figure 4:
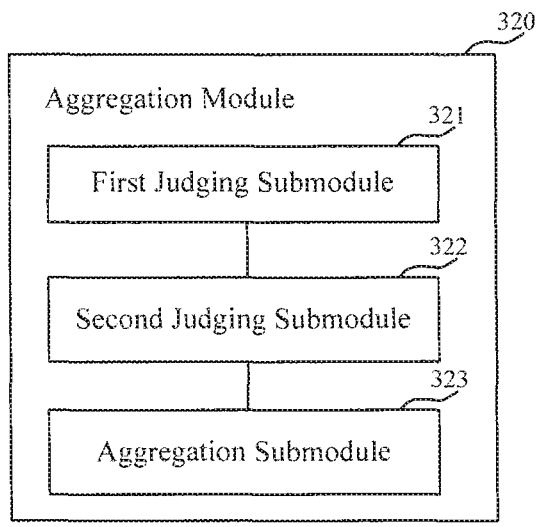
FIG. 4 is a block diagram illustrating another device for displaying information flows in a social network, according to an exemplary embodiment of the present disclosure.

As shown in FIG. 4, FIG. 4 is a block diagram illustrating another device for displaying information flows in a social network, according to an exemplary embodiment of the present disclosure. The embodiment is based on the embodiment shown in FIG. 3. The aggregation module 320 can include a first judging submodule 321, a second judging submodule 322 and an aggregation submodule 323.

The first judging submodule 321 is configured to judge whether the pieces of target information are posted by a same user.

The second judging submodule 322 is configured to, if it is judged that the pieces of target information are posted by the same user, judge whether there is interval information posted by other users between post times of respective pieces of target information.

The aggregation submodule 323 is configured to, based on a result of judging whether there is the interval information judged in the second judging submodule 322, aggregate the pieces of target information into a target information group.

In the above embodiment, the server or the client judges whether the pieces of target information are posted by the same user, and whether there is interval information posted by other users between post times of respective pieces of target information, and the pieces of target information are aggregated based on the different judging results.

Figure 5:
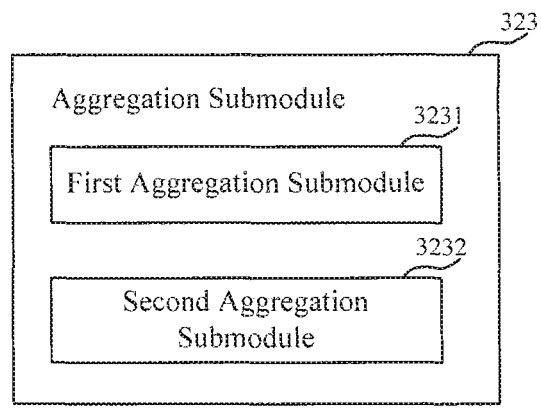
FIG. 5 is a block diagram illustrating a further device for displaying information flows in a social network, according to an exemplary embodiment of the present disclosure.

As shown in FIG. 5, FIG. 5 is a block diagram illustrating a further device for displaying information flows in a social network, according to an exemplary embodiment of the present disclosure. The embodiment is based on the embodiment shown in FIG. 4. The aggregation submodule 323 includes a first aggregation submodule 3231 and a second aggregation submodule 3232.

The first aggregation submodule 3231 is configured to, when the aggregation submodule 323 judges that there is no interval information posted by other users, aggregate the pieces of target information into a target information group.

The second aggregation submodule 3232 is configured to, when the aggregation submodule 323 judges that is the interval information posted by other users, aggregate pieces of target information greater than or equal to two pieces separated by the interval information into a target information group.

In the above embodiment, when there is no interval information posted by other users within post time of the pieces of target information, the pieces of target information are aggregated into a target information group; and when there is the interval information, pieces of target information greater than or equal to two pieces separated by the interval information (two or more consecutive pieces of target information posted by a same user) are aggregated. Thus avoiding problems that when the interval information exists, if the pieces of target information separated by the interval information are aggregated together, the post time of the target information group is not easy to determine, and an arrangement order between the target information group and the interval information is not easy to determine.

Figure 6:
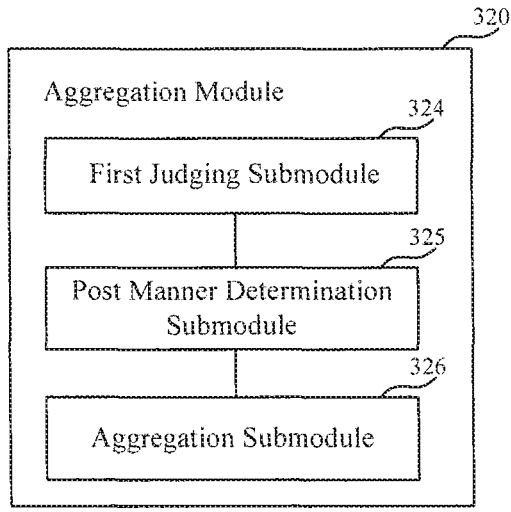
FIG. 6 is a block diagram illustrating a further device for displaying information flows in a social network, according to an exemplary embodiment of the present disclosure.

As shown in FIG. 6, FIG. 6 is a block diagram illustrating a further device for displaying information flows in a social network, according to an exemplary embodiment of the present disclosure. The embodiment is based on the embodiment shown in FIG. 3. The aggregation module 320 can include a first judging submodule 324, a post manner determination submodule 325 and an aggregation submodule 326.

The first judging submodule 324 is configured to judge whether the pieces of target information are posted by the same user.

The post manner determination submodule 325 is configured to, when the first judging submodule 324 judges that the pieces of target information are not posted by the same user, determine a post manner of the pieces of target information.

The aggregation submodule 326 is configured to, when the post manner determination submodule 325 determines that the pieces of target information are posted by at least two different users in alternate manner, aggregate the pieces of target information into target information groups respectively according to the different users to which the pieces of target information belong.

In the above embodiment, the server or the client aggregates the pieces of target information posted by different users respectively, so that the source of the target information group is clear.

Figure 7:
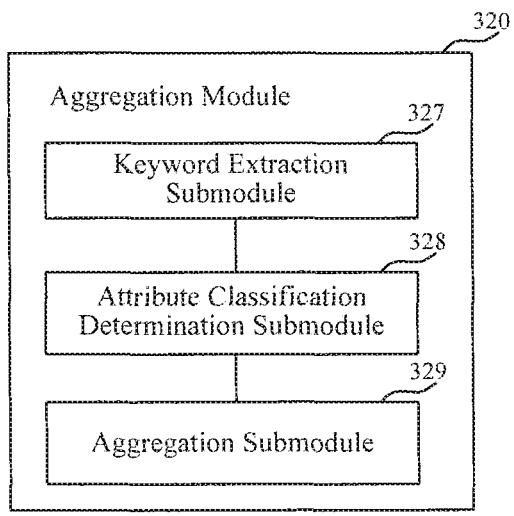
FIG. 7 is a block diagram illustrating a further device for displaying information flows in a social network, according to an exemplary embodiment of the present disclosure.

As shown in FIG. 7, FIG. 7 is a block diagram illustrating a further device for displaying information flows in a social network, according to an exemplary embodiment of the present disclosure. The embodiment is based on the embodiment shown in FIG. 3. The aggregation module 320 can include a keyword extraction submodule 327, an attribute class determination submodule 328 and an aggregation submodule 329.

The keyword extraction submodule 327 is configured to extract a east one keyword from each piece of target information.

The attribute class determination submodule 328 is configured to, based on the extracted keyword, determine attribute class of the corresponding piece of target information.

The aggregation submodule 329 is configured to, based on the different attribute class, aggregate two or more pieces of target information belonging to the same attribute class into a target information group.

In the above embodiment, the server or the client extracts a keyword from the corresponding piece of target information, and based on the keyword, determine attribute class of the each piece of target information, then based on the different attribute class, aggregate the pieces of target information respectively. Since the pieces of target information are aggregated according to the attribute class, it is able to facilitate the users to view information within the field which is of interest to them, and the user is not affected by other information which they are not interested in.

Figure 8:
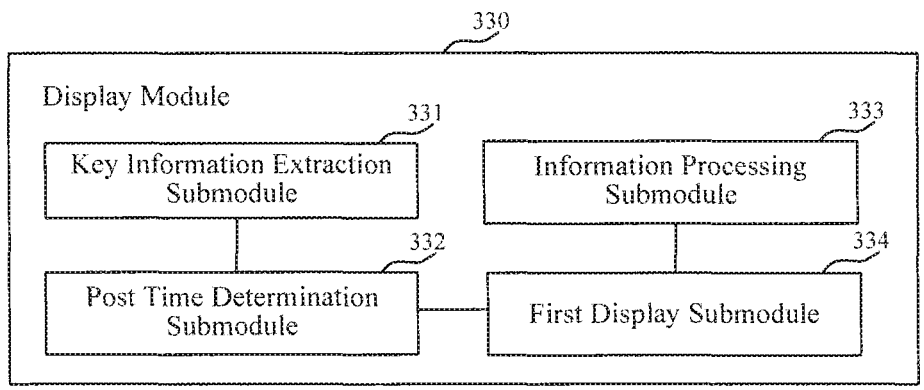
FIG. 8 is a block diagram illustrating a further device for displaying information flows in a social network, according to an exemplary embodiment of the present disclosure.

FIG. 8 is a block diagram illustrating a further device for displaying information flows in a social network, according to an exemplary embodiment of the present disclosure. The embodiment is based on the embodiment shown in FIG. 3. The display module 330 can include a key information extraction submodule 331, an information processing submodule 332, a post time determination submodule 333 and a first display submodule 334.

The key information extraction submodule 331 is configured to extract key information from the latest piece of target information newly posted in the target information group.

The information processing submodule 332 is configured to use the key information in the latest piece of target information extracted by the key information extraction submodule 331 as display information, and fold or hide other pieces of target information except the latest piece of target information.

The post time determination submodule 333 is configured to use post time of the latest piece of target information as post time of the target information group.

The first display submodule 334 is configured to display the target information group in order of post time.

The key information extracted by the key information extraction submodule 331 includes an abstract, or a keyword of the latest piece of target information, or attribute class to which the latest piece of target information belongs.

In the above embodiment, the server or the client improves display manners of the target information group, to display the key information in newly posted target information, and fold or hide other information, which can effectively save page space occupied by the target information group, and will not cause interference to other users due to "spam the flooding". Furthermore, since specific information, such as the abstract, the keyword, and the like is displayed, layout of the printed page is clear and beautiful, and the user can conveniently select unfolding the target information group to view the full target information.

Figure 9:
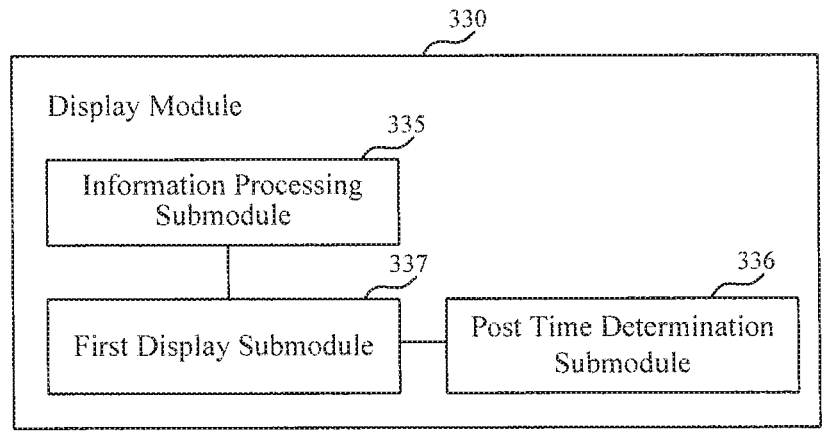
FIG. 9 is a block diagram illustrating a further device for displaying information flows in a social network, according to an exemplary embodiment of the present disclosure.

As shown in FIG. 9, is a block diagram illustrating a further device for displaying information flows in a social network, according to an exemplary embodiment of the present disclosure. The embodiment is based on the embodiment shown in FIG. 3. The display module 330 can include an information processing submodule 335, a post time determination submodule 336 and a first display submodule 337.

The information processing submodule 335 is configured to use the latest piece of target information newly posted in the target information group as display information, and fold or hide other pieces of target information except the latest piece of target information;

The post time determination submodule 336 is configured to use post time of the latest piece of target information as post time of the target information group; and The first display submodule 337 is configured to display the target information group in order of post time determined by the post time determination submodule 336.

In the above embodiment, when there is not too much content in information newly posted in the target information group, the server can display all contents of the latest piece of target information, and fold or hide other pieces of target information, so that other users are able to see all contents of the latest piece of target information.

Figure 10:
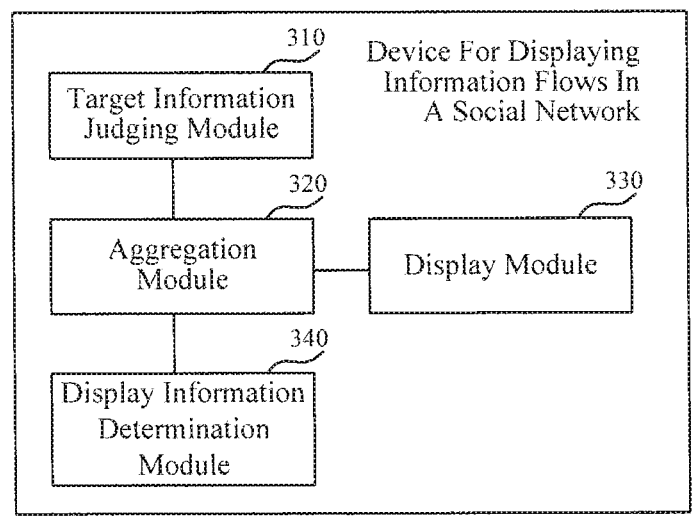
FIG. 10 is a block diagram illustrating a further device for displaying information flows in asocial network, according to an exemplary embodiment of the present disclosure.

As shown in FIG. 10, FIG. 10 is a block diagram illustrating a further device for displaying information flows in a social network, according to an exemplary embodiment of the present disclosure. The embodiment is based on the embodiment shown in FIG. 7 or FIG. 8 or FIG. 9. The device can further include a display information determination module 340.

The display information determination module 340 is configured to use the number of the pieces of target information contained in the target information group as display information.

Figure 11:
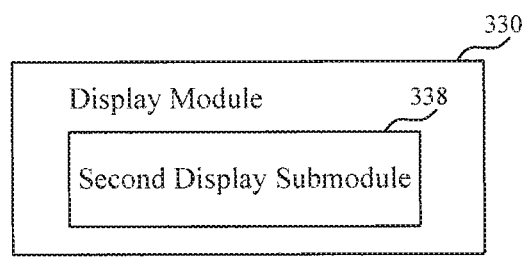
FIG. 11 is a block diagram illustrating a further device for displaying information flows in a social network, according to an exemplary embodiment of the present disclosure.

As shown in FIG. 11, FIG. 11 is a block diagram illustrating a farther device for displaying information flows in a social network, according to an exemplary embodiment of the present disclosure. The embodiment is based on the embodiment shown in FIG. 3. The display module 330 further includes a second display submodule 338.

The second display submodule 338 is configured to display information not aggregated in the information flows.

In the above embodiment, the number of pieces of target information contained in the target information group can also be displayed, so that other users are able to decide whether it is necessary to unfold the target information group to view based on information of the number of pieces.

Corresponding to the above embodiments of the method for displaying information flows in a social network, the present disclosure farther provides embodiments of a device.

With respect to the devices in the above embodiments, specific operations and functions of respective modules have been described in detail in the embodiments of the methods and therefore repeated descriptions are omitted here.

The embodiments of devices basically correspond to the embodiments of methods, and thus for related portions, the description about the embodiments of methods can be referred to. The above described embodiments of devices are only illustrative, and portions described as separated modules may be or may not be physically separated, and the portions shown as respective modules may be or may not be physical modules, i.e., the portions may be located at one place, or may be distributed over a plurality of network modules. A part or whole of the modules may be selected to realize the objects of the technical solutions of the present disclosure according to actual requirements. One of ordinary skill in this art can understand and practice the technical solutions of the present disclosure without creative work.

Correspondingly, the present disclosure further provides a server, the server includes a processor; and a memory for storing instructions executable by the processor. In an example, the processor is configured to, from information flows posted by a user of the social network, judge, within a set time period, whether there exist pieces of target information with a number of pieces being greater than or equal to a set number. When it is judged that the pieces of target information exist, the processor is configured to, according to a preset rule, aggregate the pieces of target information into a target information group, and to display the target information group.

Figure 12:
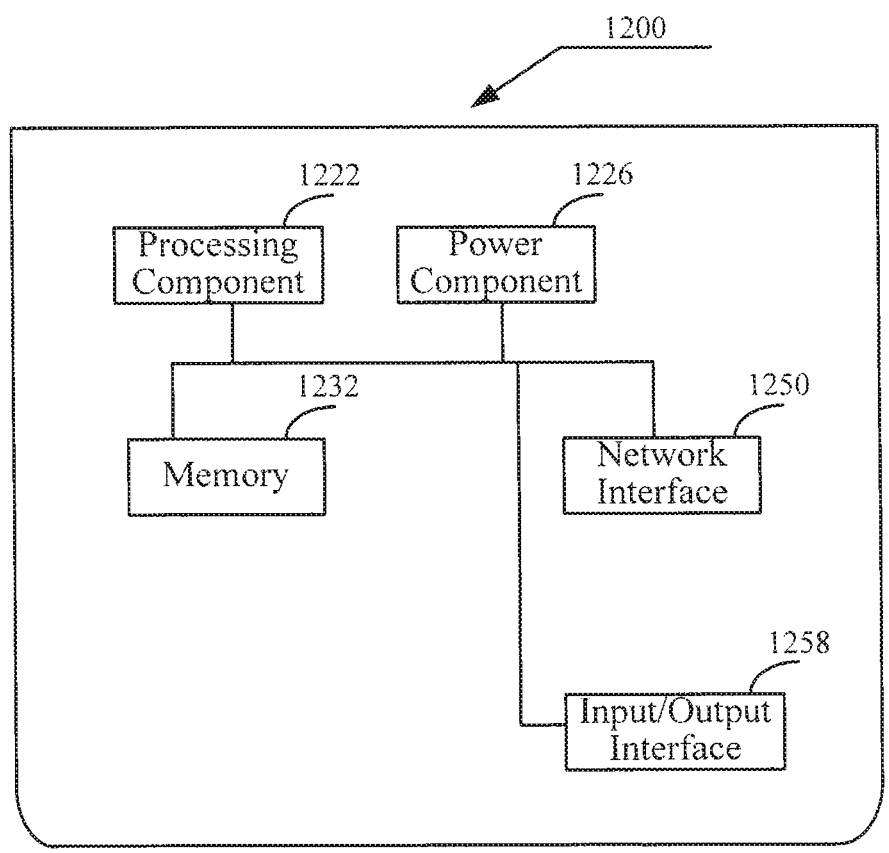
FIG. 12 is a structurally schematic diagram illustrating a device for displaying information flows in a social network, according to an exemplary embodiment.

As shown in FIG. 12, FIG. 12 is a structurally schematic diagram illustrating another device 1200 for displaying information flows in a social network, according to an exemplary embodiment. For example, the device 1200 cart be provided as a server, or a client. Referring to FIG. 12, the device 1200 can include a processing component 1222 that further includes one or more processors, and memory resources represented by a memory 1232 for storing instructions executable by the processing component 1222, such as application programs. The application programs stored in the memory 1232 cart include one or more modules each corresponding to a set of instructions. Further, the processing component 1222 is configured to execute the instructions to perform the above method for displaying information flows in a social network.

The device 1200 can also include a power component 1226 configured to perform power management of the device 1200, wired or wireless network interface(s) 1250 configured to connect the device 1200 to a network, and an input/output (I/O) interface 1258. The device 1200 can operate based on an operating system stored in the memory 1232, such as Windows Server™, Mac OS X™, Unix™, Linux™, Free BSD™, or the like.

It is noted that, in various embodiments of the disclosure, modules and submodules can be implemented as circuits, or can be implemented as software instructions to be executed by processing circuitry.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for displaying information flows in a social network, comprising:
   judging whether pieces of target information with a number of pieces being greater than or equal to a set number exist in information flows posted within a set time period by a user of the social network;
   aggregating the pieces of target information into one or more target information groups according to a preset rule when the pieces of target information exist by:
     judging whether the pieces of target information are posted by a same user;
     determining that one or more pieces of interval information posted by other users exist between the pieces of target information when the pieces of target information are posted by the same user;
     aggregating a first set of the pieces of target information that exist before the one or more pieces of interval information into a first group of the one or more target information groups;
     aggregating a second set of the pieces of target information that exist after the one or more pieces of interval information into a second group of the one or more target information groups; and
   displaying the one or more target information groups including the first group of the pieces of target information, the second group of the pieces of target information, and the one or more pieces of interval information between the first group and the second group,
   wherein displaying the one or more target information groups comprises:
     extracting key information from a latest piece of target information of the pieces of target information posted in the one or more target information groups, wherein the key information comprises an abstract, or a keyword from the latest piece of target information, or an attribute class to which the latest piece of target information belongs;
     using the key information in the latest piece of target information of the pieces of target information as display information for the one or more target information groups, and folding or hiding other pieces of target information of the pieces of target information except the latest piece of target information;
     using post time of the latest piece of target information as post time of the one or more target information groups; and
     displaying the one or more target information groups according to the display information in order of the post time of the one or more target information groups.

2. The method according to claim 1, wherein aggregating the pieces of target information into the one or more target information groups according to the preset rule when the pieces of target information exist comprises:
   determining a post manner of the pieces of target information when the pieces of target information are posted by two or more users; and
   aggregating the pieces of target information posted by different users into respective target information groups of the one or more target information groups corresponding to the different users when the pieces of target information are posted by the different users in an alternate manner.

3. The method according to claim 1, wherein aggregating the pieces of target information into the one or more target information groups according to the preset rule when the pieces of target information exist comprises:
   extracting at least one keyword from each piece of target information of the pieces of target information;
   based on the extracted keyword, determining an attribute class of each of the pieces of target information; and
   aggregating pieces of target information belonging to a same attribute class among the pieces of target information into one of the one or more target information groups.

4. The method according to claim 1, wherein the method further comprises:
   including a number of pieces of target information within the one or more target information groups in the display information.

5. The method according to claim 1, further comprising:
   displaying remaining information in the information flows that is not aggregated into the one or more target information groups.

6. A device for displaying information flows in a social network, comprising:
   a processor; and
   a memory for storing instructions executable by the processor, wherein the processor is configured to:
     judge whether pieces of target information with a number of pieces being greater than or equal to a set number exist in information flows posted within a set time period by a user of the social network;
     aggregate the pieces of target information into one or more target information groups according to a preset rule when the pieces of target information exist by:
       judging whether the pieces of target information are posted by a same user;
       determining that one or more pieces of interval information posted by other users exist between the pieces of target information when the pieces of target information are posted by the same user;

aggregating a first set of the pieces of target information that exist before the one or more pieces of interval information into a first group of the one or more target information groups;

aggregating a second set of the pieces of target information that exist after the one or more pieces of interval information into a second group of the one or more target information groups; and display the one or more target information groups including the first group of the pieces of target information, the second group of the pieces of target information, and the one or more pieces of interval information between the first group and the second group, wherein displaying the one or more target information groups comprises:

extracting key information from a latest piece of target information of the pieces of target information posted in the one or more target information groups, wherein the key information comprises an abstract, or a keyword from the latest piece of target information, or an attribute class to which the latest piece of target information belongs;

using the key information in the latest piece of target information of the pieces of target information as display information for the one or more target information groups, and folding or hiding other pieces of target information of the pieces of target information except the latest piece of target information;

using post time of the latest piece of target information as post time of the one or more target information groups; and displaying the one or more target information groups according to the display information in order of the post time of the one or more target information groups.

7. The device according to claim 6, wherein the processor is further configured to:

determine a post manner of the pieces of target information when the pieces of target information are posted by two or more users; and aggregate the pieces of target information posted by different users into respective target information groups of the one or more target information groups corresponding to the different users when the pieces of target information are posted by the different users in an alternate manner.

8. The device according to claim 6, wherein the processor is further configured to:

extract at least one keyword from each piece of target information of the pieces of target information;

based on the extracted keyword, determine an attribute class of each of the pieces of target information; and aggregate pieces of target information belonging to a same attribute class among the pieces of target information into one of the one or more target information groups.

9. The device according to claim 6, wherein the processor is further configured to:

include a number of pieces of target information within the one or more target information groups in the display information.

10. The device according to claim 6, wherein the processor is further configured to:

display information in the information flows that is not aggregated into the one or more target information groups.

11. A non-transitory computer-readable storage medium comprising instructions, executable by a processor in a device to execute operations for displaying information flows in a social network, the operations comprising:

judging whether pieces of target information with a number of pieces being greater than or equal to a set number exist in information flows posted within a set time period by a user of the social network;

aggregating the pieces of target information into one or more target information groups according to a preset rule when the pieces of target information exist by:

judging whether the pieces of target information are posted by a same user;

determining that one or more pieces of interval information posted by other users exist between the pieces of target information when the pieces of target information are posted by the same user;

aggregating a first set of the pieces of target information that exist before the one or more pieces of interval information into a first group of the one or more target information groups;

aggregating a second set of the pieces of target information that exist after the one or more pieces of interval information into a second group of the one or more target information groups; and displaying the one or more target information groups including the first group of the pieces of target information, the second group of the pieces of target information, and the one or more pieces of interval information between the first group and the second group, wherein displaying the one or more target information groups comprises:

extracting key information from a latest piece of target information of the pieces of target information posted in the one or more target information groups, wherein the key information comprises an abstract, or a keyword from the latest piece of target information, or an attribute class to which the latest piece of target information belongs;

using the key information in the latest piece of target information of the pieces of target information as display information for the one or more target information groups, and folding or hiding other pieces of target information of the pieces of target information except the latest piece of target information;

using post time of the latest piece of target information as post time of the one or more target information groups; and displaying the one or more target information groups according to the display information in order of the post time of the one or more target information groups.

* * * * *